United States Patent [19]

Behr et al.

[11] Patent Number: 4,490,398

[45] Date of Patent: Dec. 25, 1984

[54] PROCESS FOR THE PREPARATION OF SPICE EXTRACTS

[75] Inventors: Norbert Behr, Haan; Henk van der Mei, Rinteln, both of Fed. Rep. of Germany; Wolfgang Sirtl, Zurich, Switzerland; Harald Schnegelberger, Leichlingen; Othmar von Ettingshausen, Düsseldorf-Unterbach, both of Fed. Rep. of Germany

[73] Assignee: Henkel Kommanditgesellschaft auf Aktien, Düsseldorf-Holthausen, Fed. Rep. of Germany

[21] Appl. No.: 337,388

[22] Filed: Jan. 6, 1982

Related U.S. Application Data

[63] Continuation of Ser. No. 173,403, Jul. 29, 1980, abandoned.

[30] Foreign Application Priority Data

Aug. 2, 1979 [DE] Fed. Rep. of Germany ....... 2931393

[51] Int. Cl.³ .............................................. A23L 1/221
[52] U.S. Cl. ................................... 426/312; 426/318; 426/319; 426/650; 426/638
[58] Field of Search ............. 426/638, 655, 312, 318, 426/319, 429, 431, 425, 442, 478, 506, 650

[56] References Cited

U.S. PATENT DOCUMENTS

| | | | |
|---|---|---|---|
| 2,571,948 | 10/1951 | Sair et al. | 426/655 |
| 4,104,409 | 8/1978 | Vitzthum et al. | 426/318 |
| 4,123,559 | 10/1978 | Vitzthum et al. | 426/655 |
| 4,167,589 | 9/1979 | Vitzthum et al. | 426/312 |
| 4,198,432 | 4/1980 | Vitzthum et al. | 426/638 |

FOREIGN PATENT DOCUMENTS 2127611 12/1971 Fed. Rep. of Germany.

Primary Examiner—Hiram H. Bernstein
Attorney, Agent, or Firm—Hammond & Littell, Weissenberger & Dippert

[57] ABSTRACT

This invention is directed to a process for the production of extracts from spices in two stages by extraction with a non-toxic gas as solvent, the improvement which comprises in a first stage extracting from the spices essential oils functioning as aroma components by contacting the spices with liquid solvent, at a pressure in the supercritical range and a temperature in the subcritical range, separating the solvent from the spice, evaporating the solvent and separating essential oils, and in a second stage extracting from the spices the portions acting as flavor carriers by contacting the spices from the first stage with gaseous solvent, at a pressure and a temperature both in the supercritical range, separating the gaseous solvent from the spice, reducing the pressure and temperature, and separating the flavor carriers from the gaseous solvent.

4 Claims, 2 Drawing Figures

PROCESS FOR THE PREPARATION OF SPICE EXTRACTS

This is a continuation of U.S. patent application Ser. No. 173,403, filed July 29, 1980, now abandoned.

FIELD OF THE INVENTION

This invention is directed to the preparation of spice extracts. More particularly, this invention is directed to the preparation of spice extracts by extraction in two stages with a non-toxic gas as solvent.

BACKGROUND OF THE INVENTION

A process for the production of spice extracts by extraction in two stages with a non-toxic gas as solvent is known from German Pat. No. 2,127,611. According to the procedure disclosed, essential oils acting as aroma components are removed by extraction with dry gas and subsequently the portions acting as flavor carriers are extracted with a gas containing water vapor, which extractions are supercritical with regard to temperature and pressure. This known process has many disadvantageous aspects by which the quality of the spice extracts can be negatively influenced. Since this process works in the supercritical temperature range in both stages, the highly temperature-sensitive essential oils are subjected in the first stage to a high thermal stress. Furthermore, water is added in the extraction in the second stage, which addition can result in undesired quality losses by the reaction of the spice ingredients with the added water. Also, the introduction of the water requires the opening of the closed extraction system, so that the sensitive ingredients can also come in contact with atmospheric oxygen. The extraction of the essential oils in the first stage, if it is to be substantially quantitative, takes a long time, which means that the products are exposed to the higher temperature for an excessively long time.

It is also known to effect extractions with liquid carbon dioxide, where both the pressure and the temperature are in the subcritical range. However, in this process for the extraction of spices, the results obtained are highly unsatisfactory because the yields of ingredients are low and high residual values remain in the extraction residue.

The problem was therefore to find an extraction method which permits the extraction of essential oils acting as aroma components, which oils are particularly sensitive to high temperatures, in a virtually quantitative amount in a minimum of time under mild temperature conditions, that is, to achieve fractioning of the aroma components from the flavor carriers in a simple manner. Furthermore, it should be possible to extract the flavor carriers in the same closed system without the addition of water to exclude all the unfavorable effects resulting from the addition of water.

OBJECTS OF THE INVENTION

It is an object of the invention to provide an improved method of preparing spice extracts.

It is also an object of the invention to provide a method of preparing spice extracts in a two-stage extraction procedure employing a non-toxic solvent which is a gas at room temperature.

It is a further object of the invention to provide a method of preparing spice extracts whereby essential oils are obtained in a quantitative manner in a minimum of time under mild temperatures.

These and other objects of the invention will become more apparent in the discussion below.

DETAILED DESCRIPTION OF THE INVENTION

Figure 1:
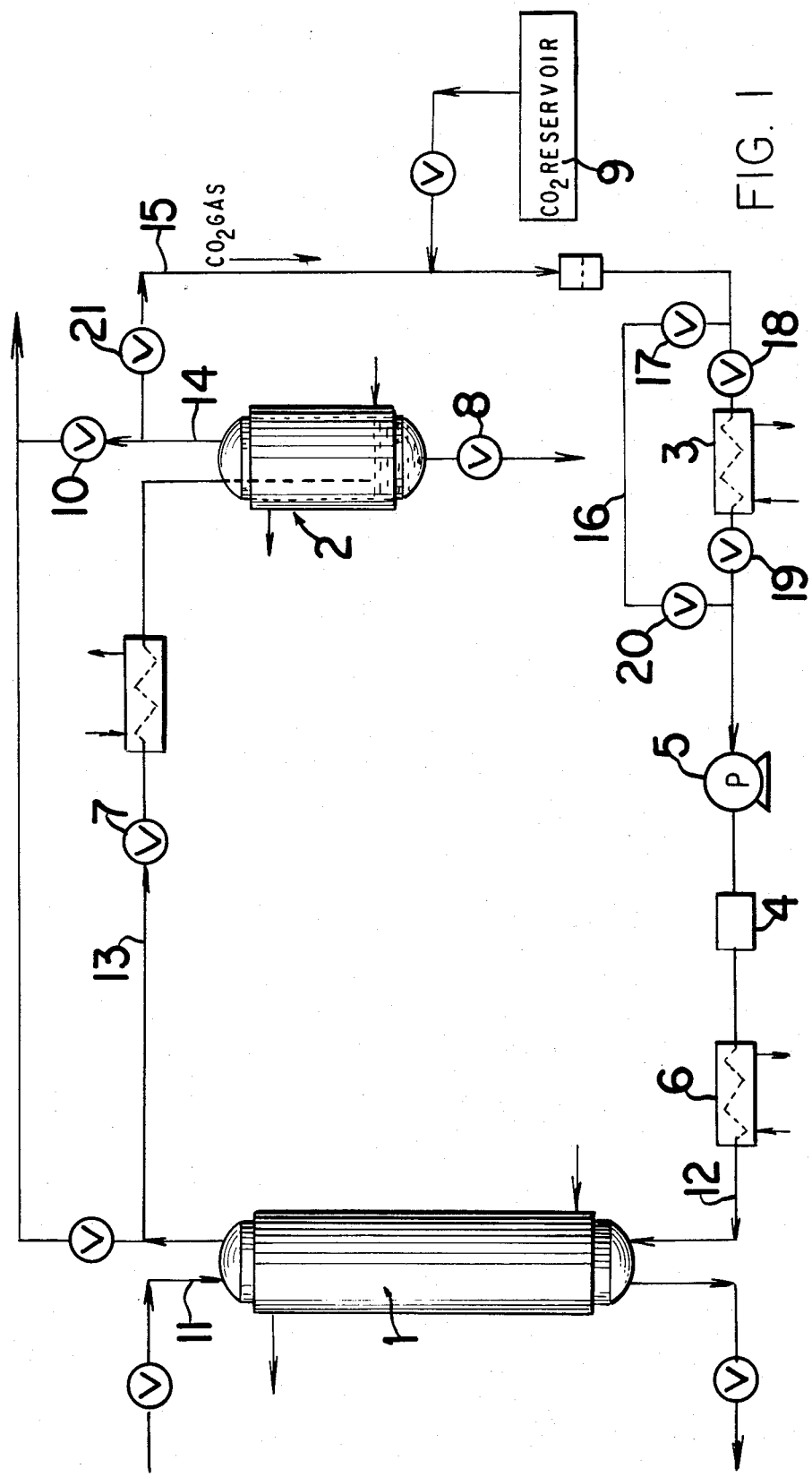
FIG. 1 is a schematic representation of an embodiment of the invention.
Figure 2:
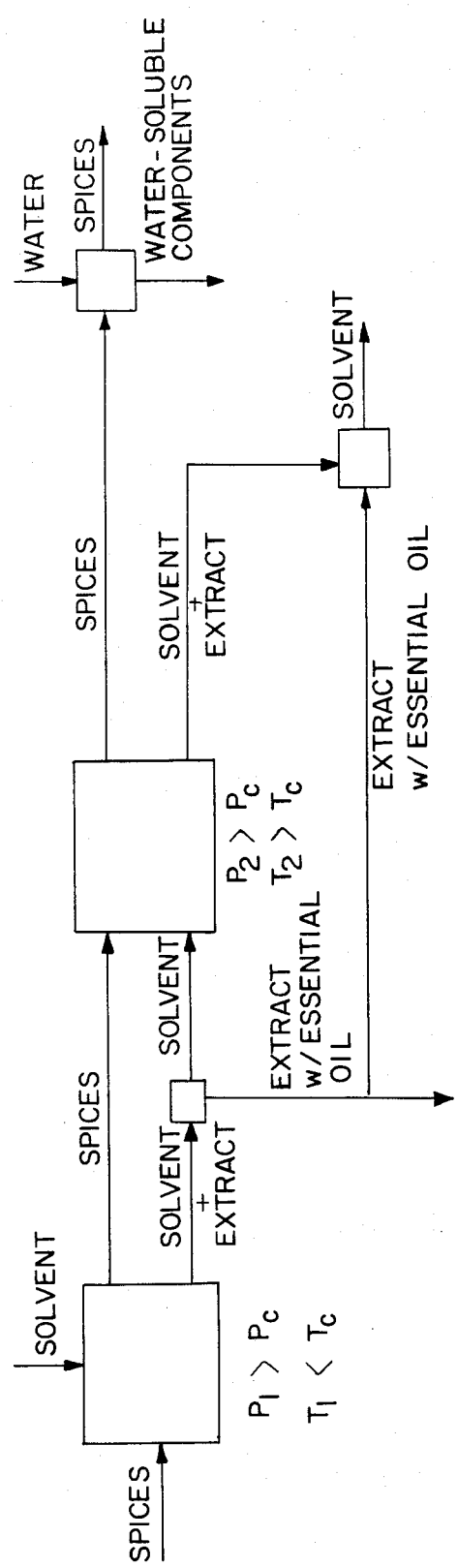
FIG. 2 is a block diagram reflecting an embodiment of the invention.

Applicants have developed an extraction process which solves the problem of not being able to separate aroma components from flavor carriers in a simple manner. According to Applicants' process, a two-stage procedure is used for the production of spice extracts by extraction with a non-toxic solvent which is a gas at room temperature. The essential oils acting as aroma components are extracted from the spices in the first stage with a liquified gas that is in the subcritical state with regard to the temperature and in the supercritical state with regard to the pressure, and the portions acting as flavor carriers are extracted in the second stage with the same gaseous solvent, which is in the supercritical state both with regard to both the temperature and the pressure. The extracts are separated from the solutions obtains by varying the pressure and/or temperature and are mixed with each other, if appropriate.

Any suitable, non-toxic gas can be used, examples of which include nitrous oxide, trifluoromethane, trifluoromonochloromethane, ethane, and carbon dioxide. A combination of two or more of these gases could also be employed. Carbon dioxide is preferred due to its relatively low cost and ready availability.

The process according to the invention is carried out substantially in two stages, which can be followed by a third stage, if necessary. The stages are as follows:

1st Stage: The essential oils acting as aroma components are removed by treating the spices with liquid carbon dioxide, which is in the subcritical state with regard to the temperature and in the supercritical state with regard to the pressure. The essential oils withdrawn according to the invention are separated in the separation vessel.

Parameters in the extraction vessel:

$P_1 > P$ critical $T_1 < T$ critical

Parameters in the separation vessel: In the separation vessel, the conditions are so selected that the extracted material is deposited quantitatively. For example:

$P_2 < P$ critical $< P_1$ $T_2 < T_1 < T$ critical

2nd Stage: The portions acting as flavor carriers are removed by treating the spices from which essential oils were extracted in the first stage with dry, supercritical carbon dioxide. The flavor carriers withdrawn according to the invention are deposited in the separation vessel.

Parameters in the extraction vessel:

$P_1 > P$ critical $T_1 > T$ critical

Parameters in the separation vessel: In the separation vessel, the conditions are so selected that the extracted material is deposited quantitatively. For example:

$P_2 < P$ critical $< P_1$ $T_2 < T_1$

These two extraction stages can be followed, if necessary, by a third extraction stage:

3rd Stage: The strictly water-soluble portions, such as polysaccharides, dyes, etc., to the extent that they were not already separated in the first two extraction stages, are removed by treating the spices from the second stage with water.

Any of the above-mentioned gases, or a mixture thereof, may be used in place of carbon dioxide in the first and second stages.

The procedure of the invention can perhaps be better and more fully understood by making reference to the drawing. According to the drawing, ground or coarsely crushed spice is placed in the extraction vessel 1, through line 11, and subsequently extraction agent or solvent (liquid carbon dioxide) is introduced through line 12. The liquid carbon dioxide evolves from carbon dioxide gas stored in storage tank 9, which is liquified in liquifier 3 and then is pumped by liquid pump 5 through heat exchanger 6 to extraction vessel 1. In heat exchanger 6 the temperature of the carbon dioxide is adjusted to the corresponding extraction temperature. The carbon dioxide is supplied to extraction vessel 1 until the desired extraction pressure is reached.

The feed spice and circulating carbon dioxide remain in contact in the extraction vessel 1 for the necessary period of time, for example, two and one-half to three hours. In operation, after the desired extraction pressure is reached, then the pressure control valve 7 is opened to permit the solvent containing extracted material, i.e., extract, to flow through line 13 and then to expand into separator vessel 2. Pressure control valve 7 operates in a manner such that it expands only the same amount of liquid that is supplied by pump 5. In this way a practically constant extraction pressure is obtained in the extraction vessel 1.

In separator 2 the substances previously dissolved in the solvent are separated by varying the pressure and/or temperature, for example, by reducing the pressure to values below the critical pressure of the liquid gas. The substances separated from the gas accumulate on the bottom of the separator 2, where they can be withdrawn directly from the bottom drain valve 8, and gaseous carbon dioxide is released through line 14 to tank valve 10.

When the separation pressure has been attained in the separator 2, tank valve 10 is closed, valve 21 is opened, and the gas freed of extractive substances can be removed at the head of the separator 2 and is returned via line 15 to the extraction cycle, where it can be completely liquified by liquifier 3. The amount of circulating carbon dioxide is measured with a flow meter 4. With a repetition of the cycle for several times over a period of several hours, a complete extraction of the spice ingredients from the spice is obtained.

In the second stage, the same equipment is utilized and the material in extraction vessel 1 is extracted with gaseous carbon dioxide that enters through line 12. In this stage either (1) liquifier 3 is not operative and is merely a conduit or (2) carbon dioxide is shunted through bypass 16 by adjustment of valves 17, 18, 19, and 20, or the heat exchanger 6 heats the liquid carbon dioxide above the critical temperature. As in the first stage, extract is recovered through drain valve 8.

This procedure works in the first stage with $P_1 > P$ critical, $T_1 < T$ critical for the extraction of aroma components and in the second stage with $P_1 > P$ critical and $T_1 > T$ critical for the extraction of the flavor carriers. Extensive extraction can be achieved both in the first stage and in the second stage in a relatively short time.

If it is desired to remove strictly water-soluble portions, such as polysaccharides, dyes, etc., the two above-mentioned stages are followed by extraction with water. The raw material is extracted in known manner with water, and the extract obtained is then concentrated, spray-dried, or freeze-dried and can be used in this form for the desired purpose.

The advantages resulting from the process of the invention are many. By treating the spices in the first stage with the liquid solvent in the supercritical pressure range but subcritical temperature range, the highly temperature-sensitive essential oils are extracted under mild conditions and high quality products are obtained. The extraction passes through both stages of the process according to the invention in the same closed system without the addition of water. The combination of the two stages without intermediate opening of the extraction or expansion vessels permits obtaining the aroma components and flavor carriers practically in one operation without the sensitive material coming in contact with atmospheric oxygen or water. Another advantage results from the fact that it is possible to separate the ingredients into the essential oils acting as aroma components and into the flavor carriers without opening the extraction vessel, as it is customary for the addition of entrainers, but rather by changing the receiver on the expansion vessel after the first stage. Additional advantages of the process of the invention include the preservation of the natural antioxidants, as well as the great reduction of the number of germs and/or the elimination of particularly undesired germs, such as mold fungi.

The process of the invention is suitable for the preparation of extracts from a wide number of spices known to the art. Examples of such spices include sage, pepper, such as Black Pepper "Madagascar", fennel, and ginger.

The following examples are intended to illustrate the invention and are not to be construed as limiting it thereto.

EXAMPLES

Example 1: Black Pepper "Madagascar"

The extraction was effected in two stages, as described, by means of carbon dioxide. For the first stage, ground black pepper "Madagascar" was placed in an extraction vessel. Carbon dioxide was circulated through the extraction vessel, which was under a pressure of 300 bar and a temperature of 28° to 30° C. The first stage extraction was for three and one-half hours, with the circulating liquid carbon dioxide from the extraction vessel being expanded into the expansion vessel. The pressure in the expansion vessel was 40 bar and the temperature was 23° to 27° C.

From the expansion vessel an aromatic extract which was liquid at room temperature was obtained. This extract was high in essential oil and low in piperine, the so-called "black principle" of pepper.

In the second stage, the ground spice in the extraction vessel was extracted with carbon dioxide at a pressure of 350 bar and a temperature of 54° to 55° C. over a period of three hours. The circulating carbon dioxide was expanded into the expansion vessel, which was operated under a pressure of 55 to 65 bar and at a temperature of 38° to 46° C. The extract obtained was low in essential oil and high in piperine, was solid at room temperature, and had a sharp and pungent flavor.

More specifically, the extraction yields (in % by weight, based on the weight of the starting material) were as follows:

First Stage

Anhydrous extracts: 4.5% (of which the essential oil represented 2.1% and piperine represented 0.9%).

Second Stage

Anhydrous extract: 6.4% (of which the essential oil represented 0.1% and piperine represented 6.3%). Total: 10.9% anhydrous extract (2.2% essential oil and 7.2 piperine).

As can be seen from the extraction results, extensive fractioning into aroma components and flavor carriers is possible according to the process of the invention without great expenditures.

Example 2: Black Pepper "Madagascar"

The procedure of Example 1 was repeated, with the exception that the extraction vessel and expansion vessel conditions were as follows:

First Stage

Extraction vessel: $P_1=300$ bar; $T_1=29°$ to 30° C.
Expansion vessel: $P_2=35-40$ bar; $T_2=23°$ to 27° C.
Extraction time: 2 hours Second Stage Extraction vessel: $P_1=312$ bar; $T_1=55°$ to 58° C.
Expansion vessel: $P_2=55-60$ bar; $T_2=43°$ to 50° C.
Extraction time: 2 hours
The extraction yields were as follows:

First Stage

Anhydrous extract: 3.6% (of which essential oil represented 2.1% and piperine represented 0.6%).

Second Stage

Anhydrous extract: 6.9% (of which essential oil represented 0.7% and piperine represented 5.2%). Total: 10.5% anhydrous extract (2.8% essential oil and 5.8% piperine).

Comparison Example

For comparison black pepper "Madagascar" was extracted according to the procedure of Example 2 as modified with regard to the teachings of German Pat. No. 2,127,611. In both stages the extraction vessel was operated in the supercritical range with regard to both temperature and pressure. In addition, in the second stage water in an amount of 50% by weight of the starting material, was added. The solvent used was carbon dioxide. The test conditions were as follows:

First Stage

Extraction vessel: $P_1=350$ bar; $T_1=55°$ to 59° C.
Expansion vessel: $P_2=60-65$ bar; $T_2=40°$ to 51° C.
Extraction time: 3 hours Second Stage (with 50% water)

Extraction vessel: $P_1=350$ bar; $T_1=55°$ to 62° C.
Expansion vessel: $P_2=40-70$ bar; $T_2=41°$ to 55° C.
Extraction time: 2 hours
The extraction yields were as follows:

First Stage

Anhydrous extract: 10.4% (of which essential oil represented 1.1% and piperine represented 8.2%).

Second Stage

Anhydrous extract: 1% (of which piperine represented 1%). Total: 11.4% anhydrous extract (essential oil 1.1%, piperine 9.2%).

As can be seen from the comparison test results, about the same total yield of anhydrous extract is obtained in the process according to the state of the art. However, a fractioning of the components was not achieved.

Example 3: Fennel

The extraction was effected in two stages by means of carbon dioxide. For the first stage, 400 g of ground fennel seeds having the following characteristics:
Bulk density: 300 g/l
Particle size: 400–800μ
were placed in a 4 liter extraction vessel. Carbon dioxide was circulated at a flow rate of 63 to 74 liters/hour through the extraction vessel, which was under a pressure of 130 bar and a temperature of 30° C. The first stage extraction was for two hours, with the circulating liquid carbon dioxide from the extraction vessel being expanded into the expansion vessel. The pressure in the expansion vessel was 40 to 45 bar and the temperature was 20° to 22° C. An aromatic extract which was liquid at room temperature was obtained from the expansion vessel.

In the second stage, the ground spice in the extraction vessel was extracted with carbon dioxide circulating at a flow rate of 60 to 68 liters/hour and at a pressure of 300 bar and a temperature of 42° C. over a period of three hours. The circulating carbon dioxide was expanded into the expansion vessel, which was operated under a pressure of 40 bar and at a temperature of 21° C.

More specifically, the extraction yields (in % by weight, based on the weight of the starting material) were as follows:

First Stage

Anhydrous extract: 9.0% (of which essential oil represented 5.6% with 4.5% anethol and 0.44% fenchone).

Second Stage

Anhydrous extract: 8.2% (of which essential oil represented 0%). Total: 17.2% anhydrous extract (5.6% essential oil).

The residue of the $CO_2$ extraction could be extracted in a third stage with water, by suspending the residue with hot water according to known methods and extracting it. The yellowish-brown extract obtained could be concentrated in the vacuum and would yield, after combination with the $CO_2$ extract, a concentrate with a pleasant fennel aroma and flavor. This water extraction of the third stage is not necessary to obtain the aromatic substance and flavors.

Example 4: Ginger

The procedure of Example 1 was repeated, with the exception that the extraction vessel and expansion vessel conditions were as follows:

First Stage

Anhydrous extract: 4.1% (of which essential oil represented 3.1%).

Second Stage

Anhydrous extract: 1.95% (of which essential oil represented 0.05%). Total: 6.05% anhydrous extract (3.15% essential oil).

Example 6: Clove "Sansibar"

The procedure of Example 1 was repeated, with the exception that the extraction vessel and expansion vessel conditions were as follows:

First Stage

Extraction vessel: $P_1 = 315$ bar; $T_1 = 28°$ C.
Expansion vessel: $P_2 = 40$ bar; $T_2 = 24°$ C.
Extraction time: 2 hours

Second Stage

Extraction vessel: $P_1 = 280$ bar; $T_1 = 46°$ C.
Expansion vessel: $P_2 = 40$ bar; $T_2 = 23°$ C.
Extraction time: 2 hours
The extraction yields were as follows:

First Stage

Anhydrous extract: 12.6% (of which essential oil represented 10.5%).

Second Stage

Anhydrous extract: 2.5% (of which essential oil represented 0.3%). Total: 15.1% anhydrous extract (10.8% essential oil).

The preceding specific embodiments are illustrative of the practice of the invention. It is to be understood however, that other expedients known to those skilled in the art or disclosed herein, may be employed without departing from the spirit of the invention or the scope of the appended claims.

We claim:

1. In a process for the production of extracts from spices in two stages by extraction with a non-toxic gas as solvent, the improvement which comprises in a first stage extracting from the spices essential oils functioning as aroma components by contacting the spices with liquid solvent, at a pressure in the supercritical range and a temperature in the subcritical range, separating the solvent from the spice, evaporating the solvent and separating essential oils by varying pressure and/or temperature of the liquid solvent, and in a second stage under anhydrous conditions extracting from the spices the portions acting as flavor carriers by contacting the spices from the first stage with gaseous solvent at a pressure and a temperature both in the supercritical range, separating the gaseous solvent from the spice, reducing the pressure and temperature, and separating the flavor carriers from the gaseous solvent by varying the pressure and/or temperature of the gaseous solvent.

2. The process of claim 1, wherein the spice extracted in the second stage is subjected to an aqueous extraction to remove any polysaccharides or dyes remaining.

3. The process of claim 1, wherein the solvent is selected from the group consisting of nitrous oxide, trifluoromethane, trifluoromonochloromethane, ethane, carbon dioxide, and mixtures thereof.

4. The process of claim 3, wherein the solvent is carbon dioxide.

* * * * *